Figure 1:
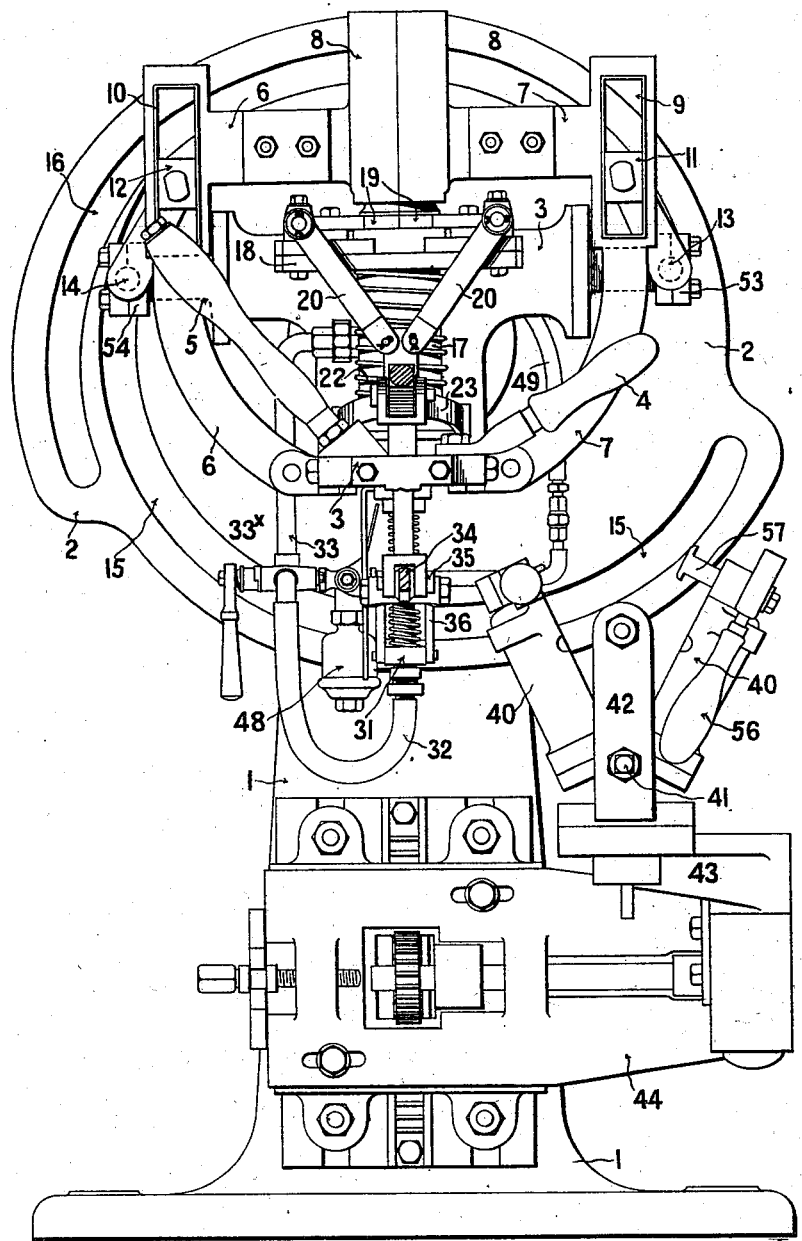

No. 723,933. PATENTED MAR. 31, 1903.
T. W. SIMPSON.
MACHINE FOR MANUFACTURING GLASS BOTTLES.
APPLICATION FILED MAY 13, 1902.
NO MODEL. 3 SHEETS—SHEET 1.

FIG. I.

Witnesses
Inventor.

No. 723,933. PATENTED MAR. 31, 1903.
T. W. SIMPSON.
MACHINE FOR MANUFACTURING GLASS BOTTLES.
APPLICATION FILED MAY 13, 1902.

NO MODEL. 3 SHEETS—SHEET 3.

Witnesses
C. H. Walters
J. T. Walker

Inventor.
Thomas William Simpson
By his attorney

UNITED STATES PATENT OFFICE.

THOMAS WILLIAM SIMPSON, OF METHLEY, ENGLAND.

MACHINE FOR MANUFACTURING GLASS BOTTLES.

SPECIFICATION forming part of Letters Patent No. 723,933, dated March 31, 1903.

Application filed May 13, 1902. Serial No. 107,191. (No model.)

*To all whom it may concern:*

Be it known that I, THOMAS WILLIAM SIMPSON, a subject of the King of Great Britain, and a resident of the Old Rectory, Methley, near Leeds, in the county of York, England, have invented certain new and useful Improvements in Machines for Manufacturing Glass Bottles, of which the following is a specification.

My invention refers to improvements in that class of machines for manufacturing glass bottles in which a divided neck-mold is employed for forming the exterior of the bottle-neck, a nipple for forming the interior of the bottle-neck, and a plunger to act on the parison; and the object of my present invention is to effect improvements in this type of machine whereby the manufacture of the bottles is facilitated and the operation of the machine rendered more perfect than heretofore. In machines of this class for manufacturing glass bottles a stationary nipple has been commonly employed for the purpose of forming the interior of the bottle-neck, and a plunger working through the nipple has been used for the purpose of piercing or forming a first opening in the molten metal and consolidating the same within the neck-mold of the machine. With such arrangements it has been general in these machines to employ a finishing-mold capable of being depressed when removing the bottle from the machine in order to allow the bottle-neck to come away from the nipple located within the same, or in other cases the finishing-mold has been opened and removed from the formed bottle and the latter has then been taken away by hand. In some instances the nipple has been given a short upward movement by raising that portion of the machine to which the said nipple was attached, and this has permitted the employment of a finishing-mold within which the bottle can be removed from the machine, the finishing-mold in such case being moved away in a horizontal direction while still containing the bottle.

Now according to the present invention I construct and arrange the nipple and plunger so as to be separately movable, both being carried within a bracket-casing upon the reversible part of the machine, and I so provide that the nipple and plunger together can be given certain simultaneous motions, and also certain further motions may be given to the plunger relatively to the nipple. The head of the plunger and also the nipple being in a position level with or below the end surface of the neck-mold, I then so operate the parts that the nipple and also the plunger are moved up together and caused to enter within the neck-mold. The movement of both parts then ceases, and the molten metal having been served to the parison-mold the movement of the plunger alone is then continued until a sufficient piercing of the metal in the parison-mold has been effected, when the plunger returns until its end is flush with the top of the nipple, the nipple during this movement remaining stationary. Upon the bottle having been acted upon by the finishing-mold and the neck-mold having been opened the nipple and plunger receive a simultaneous withdrawal from the bottle-neck and leave the bottle free to be moved away by a horizontal translation motion of the finishing-mold within which the bottle is contained. While the nipple and plunger remain withdrawn for the removal of the bottle, I provide means, hereinafter described, whereby the nipple and adjacent parts of the mechanism are subjected to an oil and air spray delivered from within the bracket-casing which then contains the nipple.

In order that the improvements which form the subject of my present invention may be readily understood, I have shown an example of construction of the same in the accompanying drawings, and I have also shown the said improvements applied to a machine of the type herein first stated. From the example I have shown of the machine having my improvements applied thereto and which I shall hereinafter describe it will be readily seen by those acquainted with the art to which this invention refers that my said improvements are readily applicable to any machines of ordinary construction of the type which I have mentioned—that is, machines which employ a divided neck-mold, a nipple, and a plunger to act on the parison.

Figure 2:
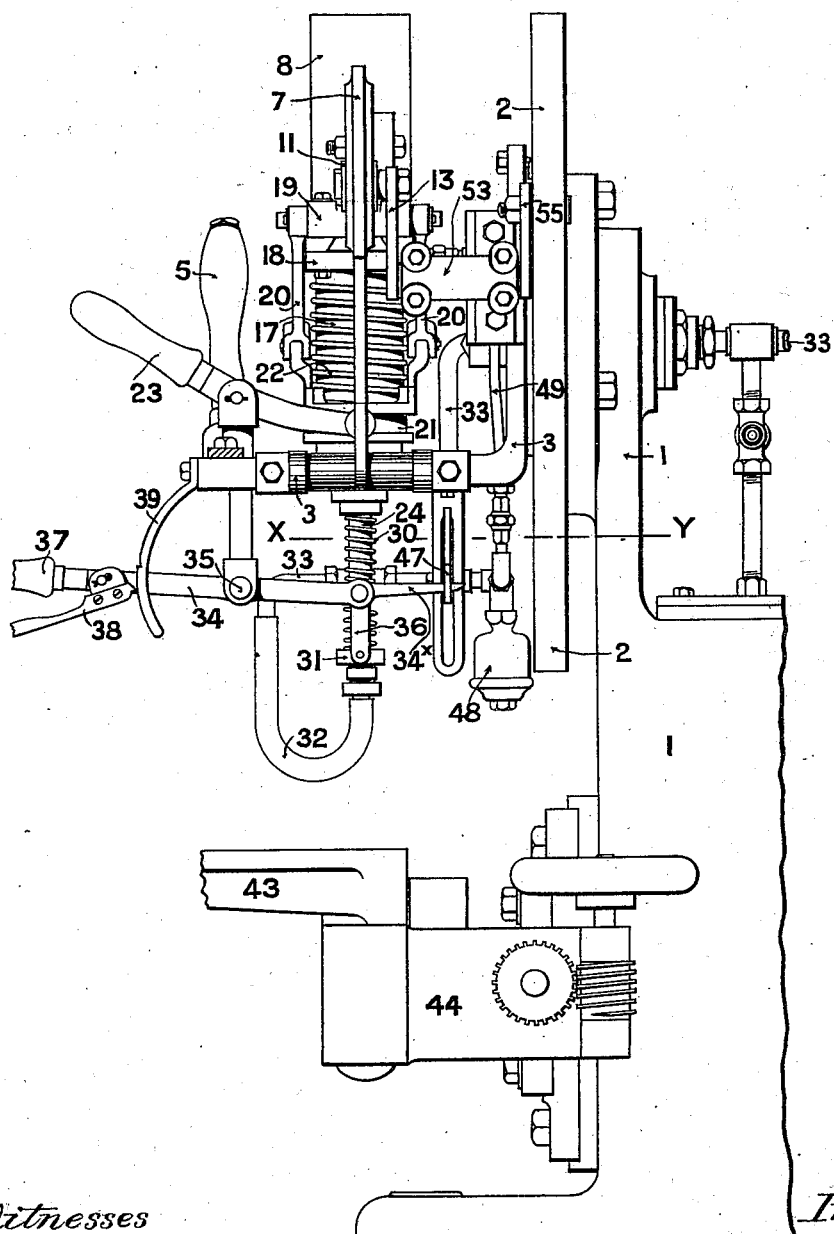
Figure 3:
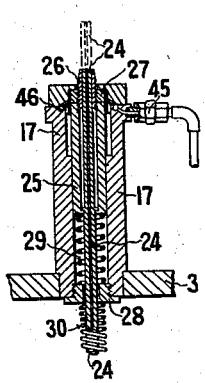
Figure 4:
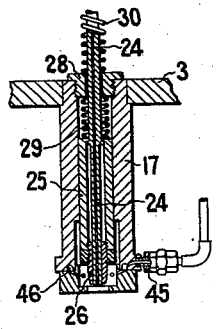
Figure 5:
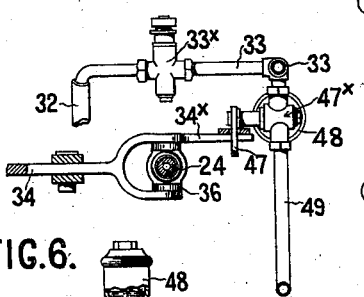
Figure 6:
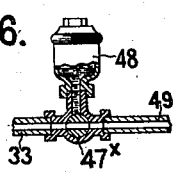
Figure 8:
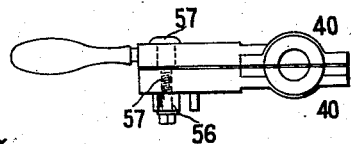
Figure 7:
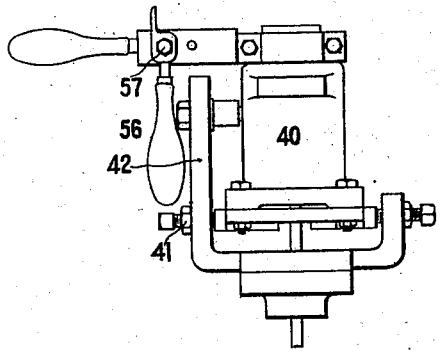

Figure 1 is a front sectional elevation of a machine to which the improvements according to my present invention are applied, and Fig. 2 is a side elevation of the same machine. Fig. 3 is a vertical section showing the construction of the nipple, the plunger, and bracket-casing according to my present invention; and Fig. 4 is a similar view of the same parts in their inverted and withdrawn positions. Fig. 5 is a horizontal section taken on the line X Y of Fig. 2 to show the cock and connections for delivering the compressed-air and oil supply, and Fig. 6 is a vertical section of the oil-reservoir and delivery-cock shown in the reverse position to Figs. 1 and 2. Fig. 7 is a side elevation of the finishing-mold detached, and Fig. 8 is a plan view of the upper part of the mold shown at Fig. 7.

Referring to the accompanying drawings, I will first describe the general construction of the machine shown at Figs. 1 and 2.

Referring, then, to Figs. 1 and 2 of the drawings, the machine there shown consists of a main standard 1, upon the front face of which is fixed or formed a stationary cam-plate 2. Passing through the upper part of the standard 1 and cam-plate 2 in suitable bearings is a revoluble shaft, upon the end of which, contiguous to the face of the cam-plate, is fixed an L-shaped bracket 3, and this L-shaped bracket is fitted at the front of its horizontal portion with handles 4 5, by which the said bracket can be rotated. Upon opposite sides of the horizontal portion of the bracket 3 there are pivoted oppositely-situated arms 6 7, which in the position of the apparatus shown in the drawings extend upwardly and carry the two separable halves of the parison-mold 8. In this machine it is provided that by the act of rotating the bracket 3 and the parts which it carries from the position shown in the drawings through one hundred and eighty degrees (whereby the parts are inverted) this half-rotation shall cause the separation of the halves which compose the parison-mold. To this end the arms 6 7 are formed with slots 9 10, in which are located slide-blocks 11 12. These slide-blocks 11 12 are carried by crank-pins of the crank-arms 13 14, the latter being fixed, respectively, to shafts carried in bearings 53 54, which are fixed to or form a part of the bracket 3. The opposite ends of the shafts carrying the crank-arms 13 14 are adjacent to the cam-plate 2, and upon these adjacent ends the said shafts carry arms 55, Fig. 2, and the arms 55 carry rollers which travel, respectively, in cam-grooves 15 16, formed in the cam-plate 2, and the cam-grooves thus act to open the parison-mold as the same is inverted and to again close the said mold when it is caused to resume the position shown in the drawings. Upon the horizontal portion of the bracket 3 I fix the upstanding bracket-casing 17, the upper part of which carries a horizontal slide 18, in which are supported the two parts of the divided neck-mold 19. Each half of the said mold 19 is connected by links 20 to a vertically-movable sleeve 21, which is held in a position to maintain the neck-mold closed by a spring 22, situated around the bracket-casing. By raising the movable sleeve 21 by means of a hand-lever 23, which is pivoted upon the bracket 3, the links 20 act to separate the two halves of the neck-mold horizontally from each other against the action of the spring 22.

Now according to my present invention I form the bracket-casing 17 with a vertical central bore, as clearly shown by the sectional views Figs. 3 and 4, and this bore contains and forms a sheath for the tubular plunger 24, which serves to pierce the parison, the plunger being located within a tubular sleeve 25, the upper end of which carries the nipple 26 for forming the mouth in the bottle-neck. The nipple 26 is attached to the upper end of its sleeve 25, so that it forms a bearing for the upper end of the plunger 24, and it is also fitted with a screwed collar 27 to regulate the extent of its projection into the neck-mold when in the position shown at Fig. 3. The plunger is formed with a collar, which is located within the bore of the nipple-sleeve 25, and when the upper end of the plunger is flush with the upper end of the nipple the collar abuts against a shoulder at the base of the sleeve 25, which shoulder forms a lower bearing to support the plunger 24. The plunger is to be normally held by springs with its upper end flush with the top of the nipple and its collar abutting on its seat in the bore of the nipple-sleeve. To this end around the plunger and acting between the inner end of the nipple-sleeve 25 and a screwed cap 28, which closes the bore of the casing 17 and forms a lower bearing for the plunger, I provide a spring 29, which acts on the base of the nipple-sleeve and tends to keep the nipple projected from its casing. Around the plunger below the casing 17 and acting between the latter and a collar 31 upon the lower end of the plunger I provide a spring 30 of less strength than the spring 29, and this spring 30 tends to normally hold the acting end of the plunger flush with the upper end of the nipple and to maintain the collar on the plunger upon its seating in the nipple-sleeve.

The plunger 24 is connected with a flexible compressed-air-supply tube 32 below the casing 17, (see Figs. 1, 2, and 5,) which by metal supply-tubes 33 receives a supply of compressed air through the bearing of the bracket 3, and the supply to the plunger is controlled by a cock $33^\times$.

The plunger and nipple are operated by a lever 34, fulcrumed at 35 to an arm pendent from the bracket 3, and the end of the lever 34 is coupled to the collar 31 of the plunger by links 36, and the position of the lever 34 is controlled by a handle 37, which may be fixed in one position by a detent 38 engaging with a segment 39.

The finishing-mold is shown at Figs. 1, 7, and 8 and is made, as is common, in two halves 40. These two halves I pivot at 41 to a bracket 42, which is carried by an arm 43, pivoted upon a slide-bracket 44, adjustable vertically by rack and pinion upon and carried by the main standard of the machine-frame, so that the mold may be swung outward and be brought into position beneath and around the parison as desired. When the two halves 40 of the finishing-mold are closed together, they are secured by raising the handle 56, which partly rotates a locking-bolt 57, which is screw-threaded, as indicated by Fig. 8, into the half 40 which carries it. The projecting end of the locking-bolt 57, which is shown at Figs. 1 and 8, when the mold is closed passes through a slot in the other half of the mold, and the rotation of the handle 56 turns the head so as to lock the two halves of the mold together, while the action of the screw-thread on the bolt 57 effectually tightens and clamps the same.

As I have before stated, when the plunger and nipple are withdrawn to within the bore of the casing 17 to allow of the bottle being removed by a horizontal translation movement, the nipple is lubricated and cooled by means of oil and air spray supplied through a spraying-nozzle, and to this end, as shown at Fig. 4 of the drawings, where the nipple is shown so withdrawn into its casing, I provide a nozzle 45, through which oil and air are delivered to an annular channel 46, from which passages open into the hollow of the casing around the nipple, and these jets act upon the nipple to effectually cool and lubricate it. I arrange this spraying device so that it is automatically brought into action, and it should be brought into action when the nipple and plunger are withdrawn within the casing and continue in action during the time they are so withdrawn. The nipple and plunger are withdrawn and maintained in their withdrawn position by the lever 34, and therefore I form an extension $34^\times$ upon the lever 34, which engages in the fork of a valve-lever 47 of a valve $47^\times$. (See Figs. 5 and 6.)

Referring to the plan view Fig. 5, the supply of compressed air contained in the tubes 33 is shut off from the oil and air spray delivery pipe 49, which extends to the nozzle 45, Fig. 3, when the plunger is in the position shown in the latter figure; but when the plunger is in the position shown at Fig. 4 the valve $47^\times$ is so turned that the compressed air can pass by the pipe 49 to the nozzle 45.

At Fig. 6 I have shown a cross-section of the plug of the valve $47^\times$, and from this it will be seen that the bore of the plug when in one position receives a supply of oil from the oil-reservoir 48, and when the plug is turned air is admitted from the pipe 33 and drives the oil contained in the plug along the pipe 49, from whence it is delivered in the form of spray onto the nipple by the nozzle 45. By this arrangement of devices when the nipple 26 is in the position shown at Fig. 4 and is so held by the lever 34 the same action of the latter lever operates the valve $47^\times$, so that the oil and air spray is delivered upon the nipple, whereas when the lever 34 is operated, so as to project the nipple into the position shown at Fig. 3, the supply of oil and air spray is automatically cut off.

The operation of the machine is as follows: I will assume the machine to be in the position shown by the drawings, Figs. 1 and 2, with the plunger and nipple in their normal positions—that is, withdrawn into the casing, so that the heads of both the plunger and the nipple are below and clear of the neck-mold, where they are held by the lever 34, being locked to the segment by the detent 38 engaging in the notch. The detent of the lever 34, Fig. 2, is then released from the segment, and the spring 29 raises the nipple-sleeve 25 and the nipple into the position shown at Fig. 3. In this position the plunger is flush with the top of the nipple, and the latter projects into the neck-mold, the sections of which are closed, and the molten metal is served to the parison-mold 8 and runs into the neck-mold 19. This being done, the lever 34 is further depressed and carries the plunger alone forward into the molten metal to pierce same, after which the said lever is released and the spring 30 brings down the plunger flush with the top of the nipple. The bracket 3 is then rotated by the handles 4 5 through an angle of one hundred and eighty degrees, and the parison-mold being separated the preliminary blowing operation is effected, the compressed air for this purpose being supplied through the hollow plunger by turning the cock $33^\times$, and the finishing-mold 40 is then brought into position and closed upon the parison and the blowing completed. The lever 34 is then turned about its fulcrum until the detent 38 engages the notch in the segment 39, thus withdrawing simultaneously both the plunger and the nipple from the neck-mold and bringing the said plunger and nipple within the casing 17 into the position shown at Fig. 4, this movement of the lever 34 also admitting the oil and air spray to the nozzle 45 for cooling and lubricating the nipple. The lever 23 is then operated to separate the halves of the neck-mold, and the finished bottle is left in the finishing-mold entirely disengaged from the neck-mold and from the nipple and is free to be moved away by rotating the bracket 43, which carries the finishing-mold.

What I claim as my invention, and desire to secure by Letters Patent, is—

1. In a machine for manufacturing glass bottles, the combination with a divided neck-mold for forming the exterior of the bottle-neck, and means for closing together the parts composing the neck-mold when forming the bottle and for separating the same to release the formed bottle; of a sheath-casing located coaxially with the neck-mold, a sliding sleeve carried in the bore of the sheath, an annular nipple carried on the end of the sleeve and adapted to enter the neck-mold to form the interior of the bottle-neck, a plunger carried within the sliding sleeve with its acting end normally flush with the end of the nipple, and means for projecting the nipple and plunger into the neck-mold to form the bottle-neck, then independently projecting the plunger into and withdrawing the plunger from the parison, and finally returning the nipple and plunger together from the bottle-neck into the sheath-casing to leave the finished bottle free for removal, substantially as set forth.

2. In a machine for manufacturing glass bottles, the combination with a divided neck-mold for forming the exterior of the bottle-neck, and means for closing together the parts of the neck-mold when forming the bottle and for separating the same to release the formed bottle; of a sheath-casing located coaxially with the neck-mold, a sliding sleeve carried in the bore of the sheath, an annular nipple carried on the end of the sleeve, means for sliding the nipple into the neck-mold to form the interior of the bottle-neck and for withdrawing the same into the sheath, a plunger carried within the sliding sleeve, means for causing the plunger to follow the motions of the nipple and for giving the plunger a farther independent projection and withdrawal beyond the nipple to pierce the parison, a chamber within the sheath to receive the nipple and plunger when withdrawn, delivery-apertures into the chamber of the casing for conveying air and oil spray onto the nipple for cooling and lubricating same, a pipe to the casing for conveying the spray thereto, and means for cutting off the spray-supply when the nipple and plunger are projected from the casing, substantially as set forth.

3. In a machine for manufacturing glass bottles, the combination with a divided neck-mold for forming the exterior of the bottle-neck and means for closing together the parts composing the neck-mold when forming the bottle and for separating the same to release the formed bottle; of a sheath-casing 17 located coaxially with and carrying the neck-mold, a sleeve 25 sliding within the sheath, an annular nipple for forming the interior of the bottle-neck carried on the end of the sleeve, a spring 29 acting on the sleeve to project the nipple into the neck-mold, a collar on the sleeve to limit the extent of projection of the nipple, a sliding plunger located within the sleeve and nipple, a collar on the plunger bearing on a shoulder in the sleeve when the end of the plunger is flush with the end of the nipple, a spring 30 on the plunger 24 of less strength than the spring 29, acting to hold the plunger-collar on the shoulder of the sleeve with the end of the plunger flush with the end of the nipple, means for moving the plunger to project the latter together with the nipple from the sheath into the neck-mold, and to withdraw both parts together into the sheath, and for projecting the plunger beyond the nipple for piercing the parison, substantially as described.

4. In a machine for manufacturing glass bottles, the combination with a stationary frame, a rotary member carried upon the frame, a divided neck-mold carried by the said member, means for separating and closing together the parts composing the neck-mold, a divided parison-mold carried by the rotary member and located above the neck-mold, means for separating and closing together the parts of the parison-mold, and a divided finishing-mold below the circular path of travel of the neck-mold; of a sheath-casing carried by the rotary member below and coaxial with the neck-mold, a sliding sleeve in the casing, a nipple carried by the sleeve and adapted to enter the neck-mold to form the interior of the bottle-neck, a sliding plunger located within the sleeve and having its acting end normally flush with the end of the nipple, means for projecting both the nipple and plunger into the neck-mold and for withdrawing the same therefrom, and means for independently projecting the plunger beyond the nipple when the latter is in its projected position and again withdrawing the plunger until its acting end is flush with the nipple, substantially as set forth.

5. In a machine for manufacturing glass bottles, the combination with a stationary frame, a horizontal shaft carried in bearings on the frame, a bracket carried by the revoluble shaft capable of being turned therewith and thereby reversed in position, a sheath-casing carried by the revoluble bracket, a divided neck-mold carried at the outer end of the sheath-casing, and means for separating and closing together the parts composing the neck-mold; of a sleeve 25 sliding within the sheath-casing 17, an annular nipple 26 on the end of the sleeve for forming the interior of the bottle-neck, a spring 29 to project the nipple into the neck-mold, a collar to limit the projection of the nipple, a plunger located within the sleeve and nipple, a collar on the plunger coacting with a shoulder in the sleeve to prevent the end of the plunger being brought below the end of the nipple, a collar on the lower end of the plunger exterior of the sheath-casing, and a spring acting between the said collar and the sheath-casing to hold the plunger withdrawn into the nipple, a lever fulcrumed on the bracket and connected to the plunger for projecting or withdrawing the plunger and for withdrawing the nipple therewith, a chamber within the sheath-casing to receive the nipple when withdrawn, delivery-apertures into the chamber of the casing for conveying air and oil spray to the nipple within the same, a tubular connection to the casing for conveying the spray thereto, a cock for opening or shutting off the spray-delivery pipe, and an extension on the plunger-operating lever to coact with the spray-delivery cock to automatically open the spray-conducting pipe when the plunger and nipple are withdrawn into the casing, and to shut the same off when the plunger and nipple are projected from the casing, substantially as set forth.

THOMAS WILLIAM SIMPSON.

Witnesses:
JOHN JOWETT,
FRANCIS W. BARRACLOUGH.